US008601437B2

(12) United States Patent
Boske et al.

(10) Patent No.: US 8,601,437 B2
(45) Date of Patent: Dec. 3, 2013

(54) REUSABLE COMPONENT DATA PERSISTENCE USING A MARKUP LANGUAGE

(75) Inventors: Kevin J. Boske, Seattle, WA (US); Andrew P. Cherry, Bothell, WA (US); Arthur C. Leonard, Redmond, WA (US); Michael J. Herzfeld, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2051 days.

(21) Appl. No.: 11/354,794

(22) Filed: Feb. 15, 2006

(65) Prior Publication Data

US 2007/0226684 A1    Sep. 27, 2007

(51) Int. Cl.
*G06F 9/45*  (2006.01)

(52) U.S. Cl.
USPC ........................................................ 717/108

(58) Field of Classification Search
USPC ........................................................ 717/108
See application file for complete search history.

(56) References Cited

U.S. PATENT DOCUMENTS

| 6,505,343 | B1  | 1/2003  | Menon et al. ............... 717/116 |
| 6,631,519 | B1  | 10/2003 | Nicholson et al. ........... 717/169 |
| 6,725,231 | B2  | 4/2004  | Hu et al. ..................... 707/102 |
| 6,799,301 | B1* | 9/2004  | Francis et al. ............... 715/210 |
| 6,836,889 | B1* | 12/2004 | Chan et al. ................... 719/310 |
| 6,845,380 | B2  | 1/2005  | Su et al. ...................... 707/102 |
| 6,871,204 | B2  | 3/2005  | Krishnaprasad et al. ..... 707/102 |
| 7,069,540 | B1* | 6/2006  | Sievert ......................... 717/120 |
| 7,543,226 | B2* | 6/2009  | Francis et al. ............... 715/234 |
| 2002/0116412 | A1* | 8/2002  | Barnes et al. ............... 707/513 |
| 2003/0163596 | A1* | 8/2003  | Halter et al. ................ 709/315 |
| 2003/0163603 | A1  | 8/2003  | Fry et al. ...................... 709/328 |
| 2003/0229608 | A1* | 12/2003 | Reynar et al. .................. 707/1 |
| 2004/0216048 | A1* | 10/2004 | Brown et al. ................. 715/530 |
| 2004/0268234 | A1  | 12/2004 | Sampathkumar et al. .... 715/513 |
| 2005/0091346 | A1  | 4/2005  | Krishnaswami et al. ..... 709/220 |
| 2005/0108278 | A1  | 5/2005  | Jones et al. .................. 707/102 |
| 2005/0132276 | A1  | 6/2005  | Panditharadhya et al. ... 715/513 |
| 2005/0187912 | A1  | 8/2005  | Matsa et al. ..................... 707/3 |
| 2005/0203933 | A1  | 9/2005  | Chaudhuri et al. ........... 707/101 |
| 2005/0246716 | A1* | 11/2005 | Smith et al. .................. 719/315 |
| 2009/0119578 | A1* | 5/2009  | Relyea et al. ................ 715/234 |

OTHER PUBLICATIONS

"MFC ActivX Controls," 3 pages, Internet site.
Frank Rice, "Importing and Exporting XSD Data in Microsoft Office Access 2003," 7 pages, Feb. 2004, Internet site.
Rich Rollman, "Exploring XML—Converting XDR Schemas to XSD," 2 pages, SQL Server Magazine 2001, Internet site.

\* cited by examiner

*Primary Examiner* — John Chavis
(74) *Attorney, Agent, or Firm* — Merchant & Gould

(57) ABSTRACT

Reusable component data persistence using markup languages may be provided. A file including data associated with a reusable software component may be opened. Next, it may be determined if the file includes a persistence element comprising a dataset. The dataset may contain the data associated with the reusable software component. The data associated with the reusable software component may be described in the markup language and may reference a sub-element in a binary format. In addition, if the file includes the persistence element comprising the dataset, saving the data associated with the reusable software component to the dataset may be performed or loading the data associated with the reusable software component from the dataset may be performed.

20 Claims, 3 Drawing Sheets

REUSABLE COMPONENT DATA PERSISTENCE USING A MARKUP LANGUAGE

BACKGROUND

Reusable software components may be presented as ActiveX controls. ActiveX may comprise a software protocol based on the Component Object Model (COM) architecture available from MICROSOFT CORPORATION. For example, ActiveX may enable an application program to add functionality by calling ready-made components that may blend in and appear as normal parts of the application program. ActiveX may be used, for example, to add user interface functions, such as 3D toolbars, notepads, calculators, or spreadsheets. On the Internet or on an intranet, ActiveX controls may be linked to a web page and downloaded by an ActiveX-compliant web browser. Like any native executable program, ActiveX controls may perform nearly any operation on a computer.

In conventional systems, reusable software component (e.g. ActiveX) control properties are persisted in a binary format. In some file formats (e.g. XMLSpreadsheet), the reusable software component control properties may be persisted outside of extensible markup language (XML), for example. Thus, the conventional strategy is to persist reusable software component control properties completely in a binary format. This often causes problems because the conventional strategy does not persist reusable software component control properties in a user friendly format such as those used by markup languages. For example, the conventional strategy merely persists reusable software component control properties completely in a binary format.

SUMMARY

Reusable component data persistence using markup languages may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

In accordance with one embodiment, a method for providing reusable software component data persistence using a markup language may comprise opening a file including data associated with a reusable software component. Next, the method may include determining if the file includes a persistence element comprising a dataset. The dataset may contain the data associated with the reusable software component. The data associated with the reusable software component may be described in the markup language and may reference a sub-element in a binary format. In addition, the method may include performing, if the file includes the persistence element comprising the dataset, saving the data associated with the reusable software component to the dataset or loading the data associated with the reusable software component from the dataset.

According to another embodiment, a system for providing reusable software component data persistence using a markup language comprises a memory storage and a processing unit coupled to the memory storage. The processing unit may be operative to open a file including data associated with a reusable software component. In addition, the processing unit may be operative to determine if the file includes a persistence element comprising a dataset. The dataset may contain the data associated with the reusable software component. The data associated with the reusable software component may be described in the markup language and referencing a sub-element in a binary format. Furthermore, he processing unit may be operative to perform, if the file includes the persistence element comprising the dataset, at least one of saving the data associated with the reusable software component to the dataset and loading the data associated with the reusable software component from the dataset.

In accordance with yet another embodiment, a computer-readable medium which stores a set of instructions which when executed performs a method for providing reusable software component data persistence using a markup language. The method executed by the set of instructions may comprise opening a file including data associated with a reusable software component. In addition, the set of instructions may comprise determining if the file includes a persistence element comprising a dataset. The dataset may contain the data associated with the reusable software component. The data associated with the reusable software component may be described in the markup language and may reference a sub-element in a binary format. Furthermore, the set of instructions may comprise performing, if the file includes the persistence element comprising the dataset, at least one of saving the data associated with the reusable software component to the dataset and loading the data associated with the reusable software component from the dataset.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
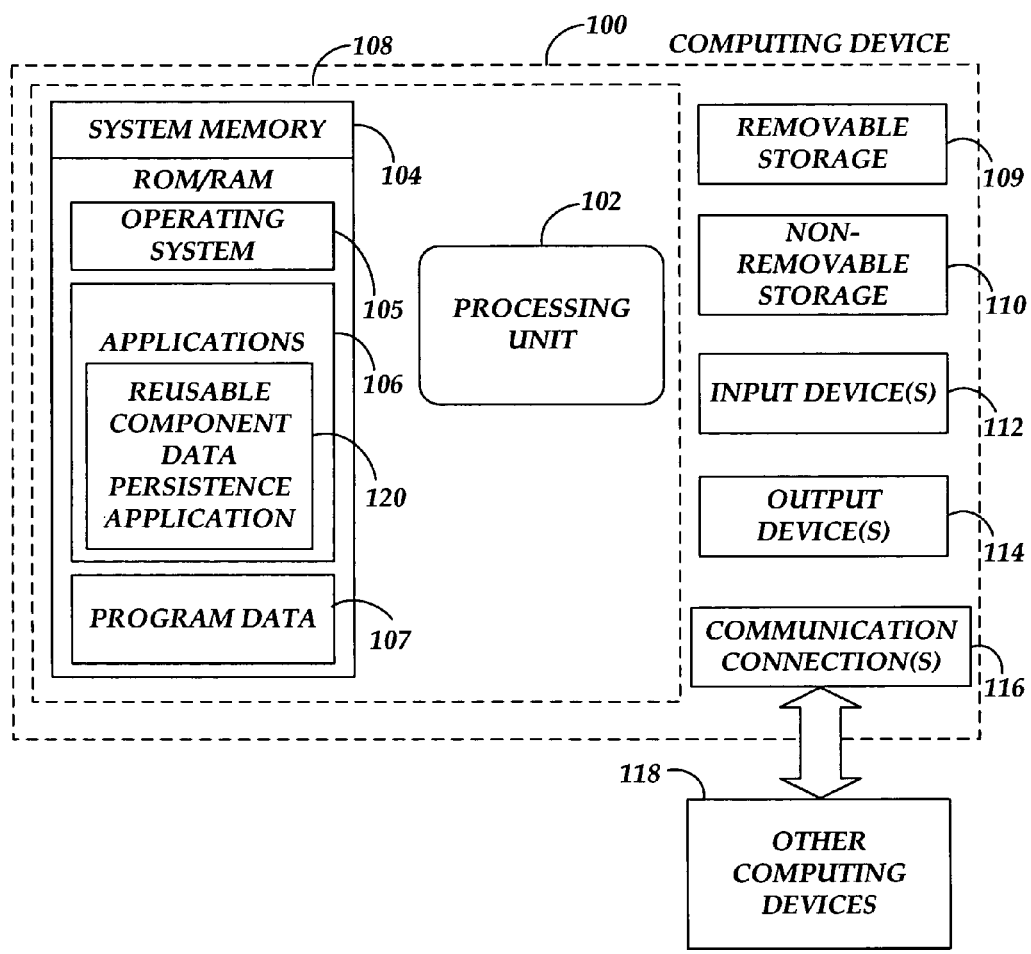
FIG. 1 is a block diagram of a system including a computing device.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the present invention provide reusable component data persistence using a markup language. Consistent with embodiments of the present invention, reusable software components may be presented, for example, as ActiveX controls. The reusable software components are not limited to being presented as ActiveX controls and other reusable components may be presented consistent with embodiments of the invention. For example, ActiveX may enable an application program to add functionality by calling ready-made components that may blend in and appear as normal parts of the application program. ActiveX may be used, for example, to add user interface functions, such as 3D toolbars, notepads, calculators, or spreadsheets. On the Internet or on an intranet, ActiveX controls may be linked to a Web page and downloaded by an ActiveX-compliant Web browser. Like any native executable program, ActiveX controls may perform nearly any operation on a computer.

Conventional systems merely persist reusable software component control properties completely in a binary format. Embodiments of the invention may store as much data as possible in, for example, an XML format. Consequently, data associated with a reusable software component may be described in a markup language (e.g. XML) and may reference a sub-element in a binary format. Within the markup language format, for example, the data associated with the reusable software component may comprise name/value pairs where a value of at least one name/value pair may correspond to a font or a picture comprising the sub-element in the binary format. For example, by storing reusable software component control properties in an XML format, developers may write code that may be more easily updated, deleted, or read. Consistent with embodiments of the invention, data that may be needed to bring a reusable software component to life may be stored in its own persistent user friendly file format.

An embodiment consistent with the invention may comprise a system for providing reusable software component data persistence using a markup language. The system may comprise a memory storage and a processing unit coupled to the memory storage. The processing unit may be operative to open a file including data associated with a reusable software component. In addition, the processing unit may be operative to determine if the file includes a persistence element comprising a dataset. The dataset may contain the data associated with the reusable software component. The data associated with the reusable software component may be described in the markup language and may reference a sub-element in a binary format. Furthermore, the processing unit may be operative to perform, if the file includes the persistence element comprising the dataset, at least one of saving the data associated with the reusable software component to the dataset and loading the data associated with the reusable software component from the dataset.

Consistent with an embodiment of the present invention, the aforementioned memory, processing unit, and other components may be implemented in a computing device, such as an computing device 100 of FIG. 1. Any suitable combination of hardware, software, and firmware may be used to implement the memory, processing unit, or other components. For example, the memory, processing unit, or other components may be implemented with computing device 100 or any of other computing devices 118, in combination with computing device 100. The aforementioned system, device, and processors are examples and other systems, devices, and processors may comprise the aforementioned memory, processing unit, or other components, consistent with embodiments of the present invention.

With reference to FIG. 1, a system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, applications 106 may include a reusable component data persistence application 120. However, embodiments of the invention may be practiced in conjunction with a graphics library, an operating system, or any application program and is not limited to any particular application or system. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are examples and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as reusable component data persistence application 120, and others described below.

While executing on processing unit 102, reusable component data persistence application 120 may perform processes including, for example, one or more of the stages of the methods described below. The aforementioned process is an example, and processing unit 102 may perform other processes. Other applications 106 that may be used in accordance with embodiments of the present invention may include electronic mail and contacts applications, word processing applications, spreadsheet applications, database applications, slide presentation applications, drawing or computer-aided application programs, etc.

Figure 2:
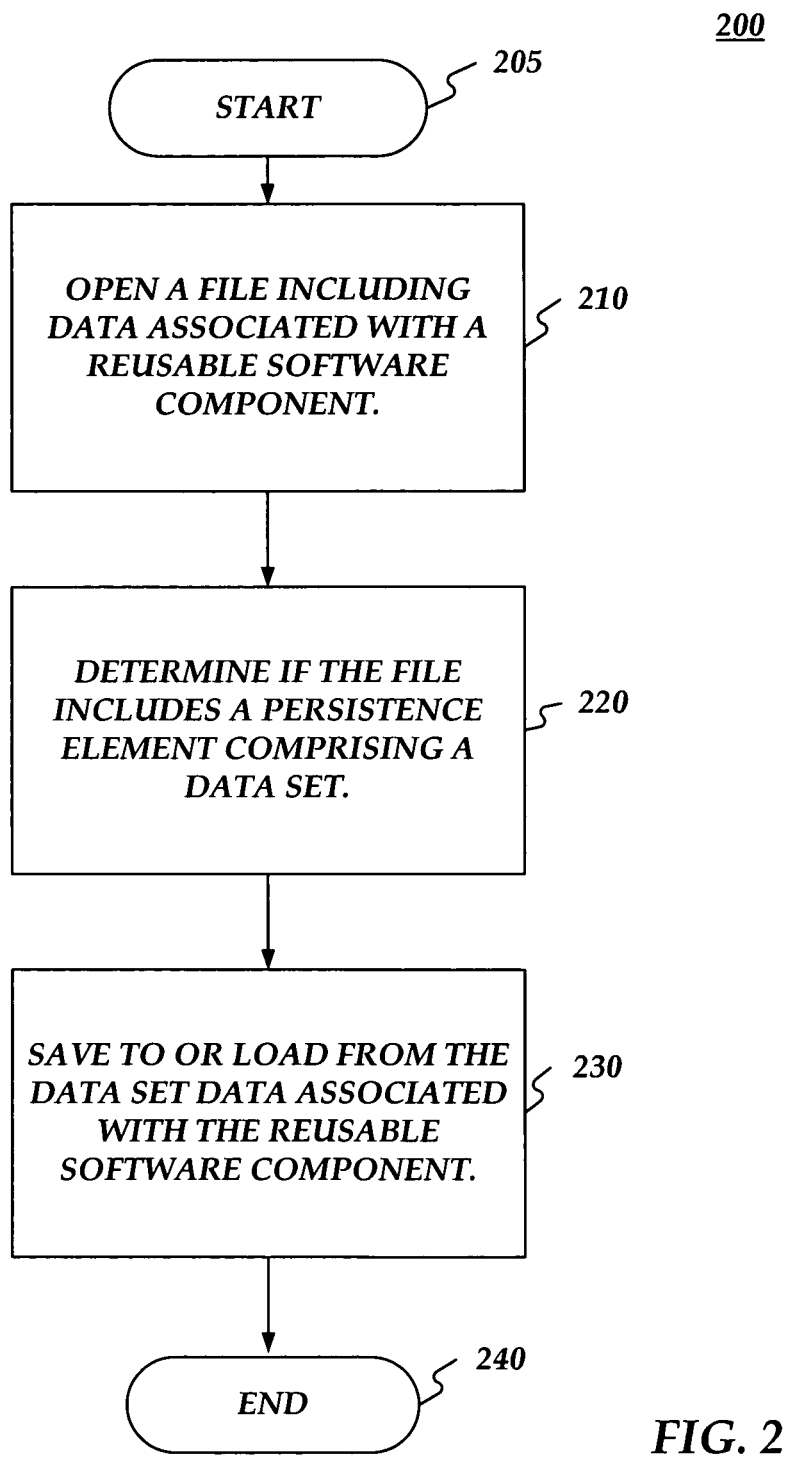
FIG. 2 is a flow chart of a method for providing reusable software component data persistence using a markup language.

FIG. 2 is a flow chart setting forth the general stages involved in a method 200 consistent with the invention for providing reusable software component data persistence using a markup language using system 100 of FIG. 1. Ways to implement the stages of method 200 will be described in greater detail below. Method 200 may begin at starting block 205 and proceed to stage 210 where computing device 100 may open a file including data associated with a reusable software component. For example, the file may comprise, but is not limited to, a word processing file configured to include the data associated with the reusable component. The reusable software component may be presented as, but is not limited to, an ActiveX control. Moreover, the reusable software component may enable a word processing application program to add functionality by calling ready-made components that may blend in and appear as normal parts of the word processing application program. The reusable software component may, for example, add user interface functions, such as 3D toolbars, notepads, calculators, or spreadsheets. On the Internet or on an intranet, the reusable software component may be linked to a web page and downloaded by a compliant web browser.

From stage 210, where computing device 100 opens the file, method 200 may advance to stage 220 where computing device 100 may determine if the file includes a persistence element comprising a data set. The dataset may contain the data associated with the reusable software component. In addition, the data associated with the reusable software component may be described in the markup language and may reference a sub-element in a binary format. For example, the markup language may comprise, but is not limited to, XML and hypertext markup language (HTML). The aforementioned are examples and the markup language may comprise other markup language types. The data set may allow values to be stored and then retrieve the next time an object is initiated. Although the object's properties may be set to a default value at design time, any values entered at run time may be lost when the object is destroyed in some conventional systems. The data set, consistent with embodiments of the invention, may allow a copy of the object to be persisted and retrieved for later reuse.

Figure 3:
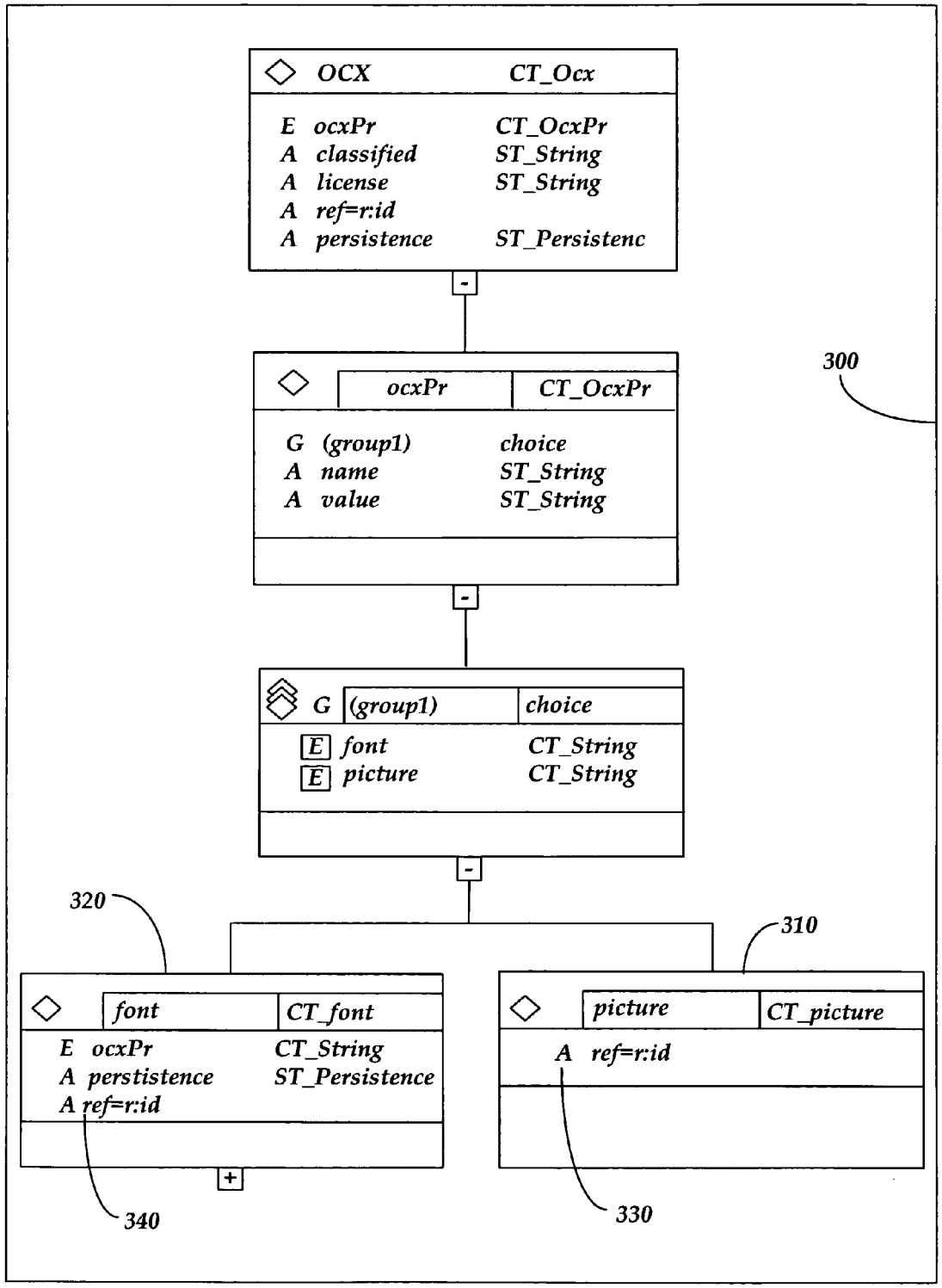
FIG. 3 is a diagram illustrating a portion of a data set.

Consistent with an embodiment of the invention, the data set may include the data associated with the reusable software component comprising name/value pairs. For example, a value of at least one name/value pair may correspond to a font or a picture comprising the sub-element in the binary format. FIG. 3 shows at least a portion of a data set 300. For example, as shown in FIG. 3, a name/value pair may have picture value 310 or a font value 320. Picture value 310 may reference a picture sub-element 330 in the binary format. Similarly, font value 320 may reference a font sub-element 340 in the binary format. Accordingly, as illustrated by FIG. 3, embodiments of the invention may store as much data as possible in, for example, an XML format. Consequently, data associated with a reusable software component may be described in a markup language (e.g. XML) and may reference a sub-element in a binary format. Furthermore, the data associated with the reusable software component may comprise name/value pairs where a value of at least one name/value pair may correspond to a font or a picture comprising the sub-element in the binary format. By storing reusable software component control properties in an XML format, for example, developers may write code that may be more easily updated, deleted, or read. With embodiments of the invention, data that may be needed to bring a reusable software component to life may be stored in its own persistent user friendly file format.

Method 300 may be an XML-friendly method to persist properties. If a control supports this process, it may be used. Other persistence types (e.g. binary storages and streams versus a property bag) may be supported by, for example, ActiveX controls and by some hosts, including down-level versions of the Microsoft Office applications available from MICROSOFT CORPORATION. Each of the down-level versions of the application may look for the supported persistence element in a different order. Therefore, embodiments of the invention may also store properties in that order. Control properties storage may be in one or two parts depending, for example, on the persistence element the control supports. If the control supports the data set or does not support any persistence element, a single XML property part may store the control's information needed and the data set. If the control does not support the data set, but supports another persistence element, the XML property part may store the control's information needed as well as a relationship to the binary property part that may contain the properties as persisted by the another persistence elements.

Furthermore, consistent with embodiments of the invention, the data set may be associated with a property part having a name including a first element describing the reusable software component type, a second element describing an index, and a third element describing an extension. The reusable software component type may be presented as, but is not limited to ActiveX. The property part may be named using the following formula:

EXAMPLE

If a command button is the first control added to a document and is supported by the data set, its property part may be named:
 activeX01.xml
If the command button in the previous example did not support the data set, two property parts may exist. These parts may be named:
 activeX01.xml
 activeX01.bin
The names do not need to match between the XML and binary parts. There may only be one relationship to the binary part. More than one relationship may be considered invalid schema and the second relationship may be cleaned up on load. The term "relationship" may refer a file format (e.g. for the "ZIP" container) and my indicate the corresponding file containing binary data, for example.

Moreover, consistent with embodiments of the invention, the data set may be associated with a property part that may include the data set and information needed to roundtrip the plurality of controls to another file. For example, the information may comprise at least one of the following: a class ID describing a control type, a license string configured to initialize a target machine that does not have a design time licenses, and a persistence string configured to store a control's properties. For example, the XML property part may contain all of the information needed to roundtrip a control in another file (save for the extended properties or properties stored in a binary.) The following data, for example, may live in the XML property part:

classid (ID)—The ClassID. This may identify what type of control is being loaded.

license (string)—The Run-Time License of the control. This may be used to initialize the control on a target machine that does not have a design time license. This attribute's value may be empty or missing for unlicensed controls.

persistence (string, enum)—The persistence element may be used to store the control's properties. This can be one of the following:

```
IPersistPropertyBag
IPersistStorage
IPersistStreamInit
IPersistStream
```

Consistent with embodiment of the invention, invalid persistence states may be defined as shown below in Table 1. For example, it is possible for a user to choose an inappropriate value for the persistence attribute. If this occurs, for example, Table 1 may describes this behavior.

TABLE 1

| Attribute Value | Actual Storage | Behavior |
| --- | --- | --- |
| persistPropertyBag | anything but Data set | Schema invalid: Fail to open file |
| persistStream persistStorageInit persistStorage | Data set | Schema invalid: Fail to open file |
| persistStream persistStorageInit persistStorage | Anything but the same | Up to the control, may fail, may crash. |
| missing | Any | Blind upgrade scenario. Attempt to load the control using the application-specific order. |
| Invalid | Any | Schema invalid: Fail to open file |

Consistent with embodiments of the invention, a single schema may be used for all controls, regardless of the persistence element supported. The schema may contain optional markup based on the element supported. Invalid schema may be handled by application 120 as part of the schema validation. For example, the following logic may describe how the schema may validate:

```
If (Control supports IPersistPropertyBag or supports no property
bag or other elements)
    0 - infinite   ocxPr elements
        0          relationships to Binary parts
    Else
        0          ocxPr elements
        0 - 1      relationships to Binary parts
```

Invalid schema may be handled by application 120 as part of a schema validation. The following logic may describe how the schema may validate:

```
If (Control supports IPersistPropertyBag or supports no elements)
    0 - infinite  ocxPr elements
        0         relationships to Binary parts
    Else
        0         ocxPr elements
        0 - 1     relationships to Binary parts
```

In addition, consistent with an embodiment of the invention, data associated with the reusable software component may include another kind of object, specifically a font or picture.

Once computing device 100 determines if the file includes the persistence element comprising the data set in stage 220, method 200 may continue to stage 230 where computing device 100 may perform, if the file includes the persistence element comprising the data set; i) saving the data associated with the reusable software component to the dataset; and ii) loading the data associated with the reusable software component from the dataset. For example, the data set may allow a copy of the object to be persisted and retrieved for later reuse. For example, a class used to calculate loans might use a data set to persist an interest rate between instances rather than entering it each time the class is used. Furthermore, embodiments of the invention may include computing device 100 determining if the file includes a persistence element comprising an element other than the data set. If the file includes the persistence element comprising the element other than the data set, computing device 100 may save the data associated with the reusable software component from a binary file and loading the data associated with the reusable software component from the binary file. In other words, embodiments of the invention may allow a copy of an object to be persisted in a binary format and retrieved for later reuse. After computing device 100 saves to or loads from the data set at least one of the plurality of embedded controls in stage 230, method 200 may then end at stage 240.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing reusable software component data persistence using a markup language, the method comprising:

opening a file including data associated with a reusable software component, the file being a word processing file configured to enable a word processing application program to call the reusable software component;

calling the reusable software component, the reusable software components adding user interface functions to the word processing application;

determining if the file includes a persistence element comprising a dataset, the dataset containing the data associated with the reusable software component, the data associated with the reusable software component being described in the markup language and referencing a sub-element in a binary format; and performing, if the file includes the persistence element comprising the dataset, at least one of the following: saving the data associated with the reusable software component to the dataset and loading the data associated with the reusable software component from the dataset, wherein saving the data associated with the reusable software component and loading the data associated with the reusable software component comprises saving control properties associated with the added user interface functions in the markup language and loading the saved control properties upon a reloading of the word processing file.

2. The method of claim 1, further comprising:

determining if the file includes the persistence element comprising an element other than the data set; and performing, if the file includes the persistence element comprising the element other than the data set, at least one of the following: saving the data associated with the reusable software component from a binary file and loading the data associated with the reusable software component from the binary file.

3. The method of claim 1, wherein the data set is associated with a property part having a name including a first element describing the reusable software component type, a second element describing an index, and a third element describing an extension.

4. The method of claim 1, wherein the data set is associated with a property part that includes the data set and information needed to roundtrip the data associated with the reusable software component to another file.

5. The method of claim 4, wherein the information comprises at least one of the following: a class ID describing a control type, a license string configured to initialize the reusable software component on a target machine that does not have a design time license, and a persistence string configured to store the reusable software component's properties.

6. The method of claim 1, further comprising determining if the file includes the persistence element comprising the data set, wherein the data associated with the reusable software component being described in the markup language comprising extensible markup language (XML).

7. The method of claim 1, wherein the data set includes the data associated with the reusable software component comprising name/value pairs wherein a value of at least one name/value pair corresponds to one of a font and a picture comprising the sub-elements in the binary format.

8. A system for providing reusable software component data persistence using a markup language, the system comprising:
a memory storage; and
a processing unit coupled to the memory storage, wherein the processing unit is operative to:
open a file including data associated with a reusable software component the file being a word processing file configured to enable a word processing application program to call the reusable software component;
call the reusable software component for adding user interface functions to the word processing application;
determine if the file includes a persistence element comprising a dataset, the dataset containing the data associated with the reusable software component, the data associated with the reusable software component being described in the markup language and referencing a sub-element in a binary format; and
perform, if the file includes the persistence element comprising the dataset, at least one of the following: saving the data associated with the reusable software component to the dataset and loading the data associated with the reusable software component from the dataset, wherein saving the data associated with the reusable software component and loading the data associated with the reusable software component comprises saving control properties associated with the added user interface functions in the markup language and loading the control properties upon a reloading of the word processing file.

9. The system of claim 8, wherein the processing unit is further operative to:
determine if the file includes the persistence element comprising an element other than the data set; and
perform, if the file includes the persistence element comprising the element other than the data set, at least one of the following: saving the data associated with the reusable software component from a binary file and loading the data associated with the reusable software component from the binary file.

10. The system of claim 8, wherein the data set is associated with a property part having a name including a first element describing the reusable software component type, a second element describing an index, and a third element describing an extension.

11. The system of claim 8, wherein the data set is associated with a property part that includes the data set and information needed to roundtrip the data associated with the reusable software component to another file.

12. The system of claim 11, wherein the information comprises at least one of the following: a class ID describing a control type, a license string configured to initialize the reusable software component on a target machine that does not have a design time license, and a persistence string configured to store the reusable software component's properties.

13. The system of claim 8, wherein the data set includes the data associated with the reusable software component comprising name/value pairs wherein a value of at least one name/value pair corresponds to one of a font and a picture comprising the sub-element in the binary format.

14. A computer-readable storage device which stores a set of instructions which when executed performs a method for providing reusable software component data persistence using a markup language, the method executed by the set of instructions comprising:

opening a file including data associated with a reusable software component, the file being a word processing file configured to enable a word processing application program to call the reusable software component, the reusable software component being configured to add functionality to the word processing application program by adding user interface functions to the word processing application program based on the data included in the file;
determining if the file includes a persistence element comprising a dataset, the dataset containing the data associated with the reusable software component, the data associated with the reusable software component being described in the markup language and referencing a sub-element in a binary format; and
if the file includes the persistence element comprising the dataset saving the data associated with the reusable software component to the dataset and loading the data associated with the reusable software component from the dataset, wherein saving the data associated with the reusable software component and loading the data associated with the reusable software component enables the word processing application program to persist the added user interface functions upon a reloading of the word processing application program.

15. The computer-readable storage device of claim 14, further comprising:
determining if the file includes the persistence element comprising an element other than the data set; and
performing, if the file includes the persistence element comprising the element other than the data set, at least one of the following: saving the data associated with the reusable software component from a binary file and loading the data associated with the reusable software component from the binary file.

16. The computer-readable storage device of claim 14, wherein the data set is associated with a property part having a name including a first element describing the reusable software component type, a second element describing an index, and a third element describing an extension.

17. The computer-readable storage device of claim 14, wherein the data set is associated with a property part that includes the data set and information needed to roundtrip the data associated with the reusable software component to another file.

18. The computer-readable storage device of claim 17, wherein the information comprises at least one of the following: a class ID describing a control type, a license string configured to initialize the reusable software component on a target machine that does not have a design time licenses, and a persistence string configured to store the reusable software component's properties.

19. The computer-readable storage device of claim 14, further comprising determining if the file includes the persistence element comprising the data set, wherein the data associated with the reusable software component being described in the markup language comprising extensible markup language (XML).

20. The computer-readable storage device of claim 14, wherein the data set includes the data associated with the reusable software component comprising name/value pairs wherein a value of at least one name/value pair corresponds to one of a font and a picture comprising the sub-element in the binary format.

* * * * *